US008434156B2

United States Patent
Li et al.

(10) Patent No.: US 8,434,156 B2
(45) Date of Patent: Apr. 30, 2013

(54) METHOD, ACCESS NODE, AND SYSTEM FOR OBTAINING DATA

(75) Inventors: Lijuan Li, Shenzhen (CN); Zhefeng Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 13/434,570

(22) Filed: Mar. 29, 2012

(65) Prior Publication Data

US 2012/0185950 A1   Jul. 19, 2012

Related U.S. Application Data

(63) Continuation of application No. PCT/CN2010/076520, filed on Sep. 1, 2010.

(30) Foreign Application Priority Data

Sep. 29, 2009   (CN) .......................... 2009 1 0235276

(51) Int. Cl.
*G06F 7/04*     (2006.01)
*H04L 9/32*     (2006.01)
*H04L 29/06*    (2006.01)
*G06F 21/00*    (2006.01)

(52) U.S. Cl.
USPC ........ 726/27; 726/2; 726/4; 726/17; 713/166; 713/168; 713/170; 713/182

(58) Field of Classification Search .................. None
See application file for complete search history.

(56) References Cited

U.S. PATENT DOCUMENTS

| 7,861,288 | B2 * | 12/2010 | Tsuruoka et al. | ............... 726/10 |
| 2005/0125674 | A1 * | 6/2005 | Nishiki et al. | ................ 713/182 |
| 2006/0046713 | A1 * | 3/2006 | Yokota et al. | ............. 455/426.1 |
| 2007/0053334 | A1 * | 3/2007 | Sueyoshi et al. | .............. 370/338 |

(Continued)

FOREIGN PATENT DOCUMENTS

| CN | 1852108 A | 10/2006 |
| CN | 1901448 A | 1/2007 |

(Continued)

OTHER PUBLICATIONS

Written Opinion of the International Searching Authority dated Dec. 9, 2010 in connection with International Patent Application No. PCT/CN2010/076520.

(Continued)

Primary Examiner — Nathan Flynn
Assistant Examiner — Trang Doan (57) ABSTRACT

The present invention discloses a method, an access node, and a system for obtaining data. The method includes: receiving a data obtaining request sent by a client and obtaining an authentication result of multilevel authentication performed on the data obtaining request; when the authentication result of the data obtaining request is successful, obtaining data to be obtained corresponding to the data obtaining request and sending the data to be obtained to the client, or, obtaining information about a content storage node to which the data to be obtained corresponding to the data obtaining request belongs and sending the information about the content storage node to the client. The embodiments of the present invention may ensure security of data obtaining, avoid a single-point failure or bottleneck, and reduce the cost when data is obtained from a data storage platform.

16 Claims, 9 Drawing Sheets

U.S. PATENT DOCUMENTS

| | | | |
|---|---|---|---|
| 2007/0234038 A1* | 10/2007 | Jin | 713/155 |
| 2007/0276838 A1 | 11/2007 | Abushanab et al. | |
| 2008/0046983 A1 | 2/2008 | Lester et al. | |
| 2008/0282325 A1* | 11/2008 | Oyama et al. | 726/4 |
| 2009/0064289 A1* | 3/2009 | Jang | 726/4 |
| 2009/0217353 A1* | 8/2009 | Zheng | 726/3 |

FOREIGN PATENT DOCUMENTS

| | | |
|---|---|---|
| CN | 101083600 A | 12/2007 |
| CN | 101409706 A | 4/2009 |
| EP | 1 912 376 A1 | 4/2008 |
| WO | WO 2007/143939 A1 | 12/2007 |

OTHER PUBLICATIONS

International Search Report dated Dec. 9, 2010 in connection with International Patent Application No. PCT/CN2010/076520.

Partial Translation of First Chinese Office Action of Chinese Application No. 200910235276.7 dated Jun. 6, 2012, 10 pages.

* cited by examiner

METHOD, ACCESS NODE, AND SYSTEM FOR OBTAINING DATA

CROSS-REFERENCE TO RELATED APPLICATIONS

This application is a continuation of International Application No. PCT/CN2010/076520, filed on Sep. 1, 2010, which claims priority to Chinese Patent Application No. 200910235276.7, filed on Sep. 29, 2009, both of which are hereby incorporated by reference in their entireties.

TECHNICAL FIELD

The present invention relates to the field of network communications technologies, and in particular, to a method, an access node, and a system for obtaining data.

BACKGROUND

With development of network technologies and popularity of network use, the volume of data in the world soars up continuously. Therefore, for an enterprise, it is necessary to take into account an issue of storing and obtaining an ocean of data. In the prior art, solutions for storing and obtaining an ocean of data include a Google file system (Google File System, GFS) and a simple storage service (Simple Storage Service, S3). GFS architecture includes a master manager (master) and multiple chunk servers (chunk server). The master manager manages all chunk servers in a centralized manner and data is stored in the chunk servers in chunks. When needing to obtain data, a client first sends a request to the master manager, where the request includes information about a chunk that stores data to be obtained, and the master manager sends information about a storage position of the block that stores the data to be obtained to the client. Afterwards, the client obtains the data from the chunk specified by the information about the storage position. In S3 architecture, when a client needs to obtain content from a storage platform, an application server signs a request of the client and sends a uniform resource locator (Uniform Resource Locator, URL) that includes signature information to the client, and afterwards, the client may obtain the data according to the URL.

During the implementation of the present invention, the inventor finds that the prior arts have at least the following problems: The GFS requires a master manager for centralized management, which may cause a single-point failure or bottleneck problem; because the client directly obtains data from a storage node, a large quantity of public IP addresses are required and therefore the cost is high; in addition, the GFS architecture lacks a security policy. The S3 takes the security policy into account, but because the application server returns a signature to the client, if the URL is stolen during the returning process, security of data in the storage platform is still affected.

SUMMARY

Embodiments of the present invention provide a method, an access node, and a system for obtaining data to resolve problems of poor security performance, single-point failure or bottleneck, and high cost occurring when data is obtained from a data storage platform.

An embodiment of the present invention provides a method for obtaining data, including:

receiving a data obtaining request sent by a client and obtaining an authentication result of multilevel authentication performed on the data obtaining request; and when the authentication result of the data obtaining request is successful, obtaining data to be obtained corresponding to the data obtaining request and sending the data to be obtained to the client, or obtaining information about a content storage node to which the data to be obtained corresponding to the data obtaining request belongs and sending the information about the content storage node to the client.

An embodiment of the present invention provides an access node, including:

a first module, configured to receive a data obtaining request sent by a client and obtain an authentication result of multilevel authentication performed on the data obtaining request; and a second module, configured to, when the authentication result of the data obtaining request is successful, obtain data to be obtained corresponding to the data obtaining request and send the data to be obtained to the client, or obtain information about a content storage node to which the data to be obtained corresponding to the data obtaining request belongs and send the information about the content storage node to the client.

An embodiment of the present invention provides a system for obtaining data, including:

an access node, configured to receive a data obtaining request sent by a client, where the data obtaining request carries an application ID of an application server to which the client belongs and a content ID of data to be obtained; and a content management node, configured to perform first authentication on a relationship between the application ID and the content ID, and return a first authentication result and attribute information corresponding to the content ID to the access node; where:

the access node is further configured to obtain an authentication result of the data obtaining request according to the first authentication result and the attribute information, and when the authentication result of the data obtaining request is successful, obtain the data to be obtained corresponding to the data obtaining request, and send the data to be obtained to the client, or obtain information about a content storage node to which the data to be obtained corresponding to the data obtaining request belongs and send the information about the content storage node to the client.

According to the preceding technical solutions, in the embodiments of the present invention, the data obtaining request is received and processed by an access node, so that one or more than one IP address may be disclosed publicly to reduce the cost; multilevel authentication is performed on the data obtaining request to enhance security of data obtaining; and the data obtaining is completed jointly by the access node, an authentication node, and a data storage node, thereby avoiding problems of single-point failure and bottleneck.

DETAILED DESCRIPTION

The technical solutions of the embodiments of the present invention are further described in detail with reference to the accompanying drawings and embodiments.

Figure 1:
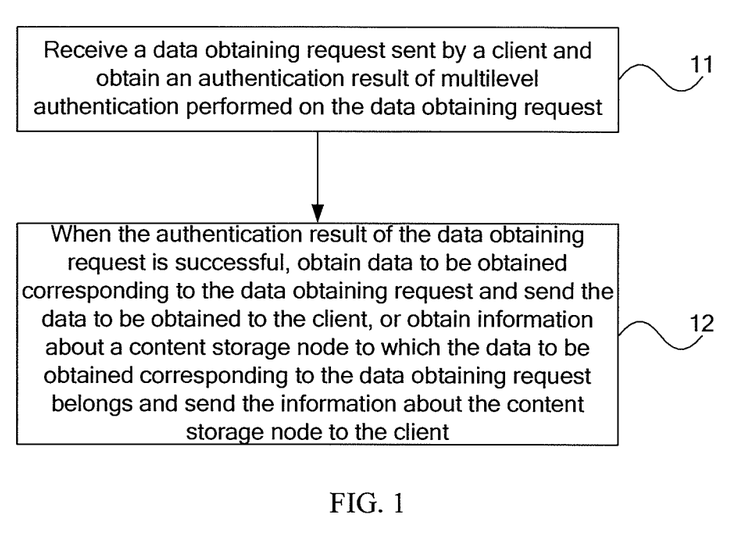
FIG. 1 is a flowchart of a method according to a first embodiment of the present invention.

FIG. 1 is a flowchart of a method according to a first embodiment of the present invention, including the following steps:

Step 11: An access node receives a data obtaining request sent by a client and obtains an authentication result of multilevel authentication performed on the data obtaining request.

The multilevel authentication includes first authentication where the access node performs authentication with a content management node on whether the content belongs to an application and may further include second authentication where the access node obtains an address of an application server from the content management node and performs authentication with the application server on whether a user has a permission to download the content.

Step 12: When the authentication result of the data obtaining request is successful, the access node obtains data to be obtained corresponding to the data obtaining request and sends the data to be obtained to the client, or obtains information about a content storage node to which the data to be obtained corresponding to the data obtaining request belongs and sends the information about the content storage node to the client. The information about the content storage node includes a content storage node list that denotes a position or an identifier of the content storage node itself and information that denotes a domain to which the content storage node belongs.

Step 11 may be completed by an authenticating module (or a first module) in the access node and step 12 may be completed jointly by a caching module, a message processing module, a redirecting module, and a data forwarding module in the access node.

In this embodiment, the data obtaining request is received and processed by an access node, so that an IP address of one or more than one access node may be disclosed publicly to reduce the cost; multilevel authentication is performed on the data obtaining request to enhance security of data obtaining; and the data obtaining is completed jointly by the access node, an authentication node, and a data storage node, thereby avoiding problems of single-point failure and bottleneck.

Figure 2:
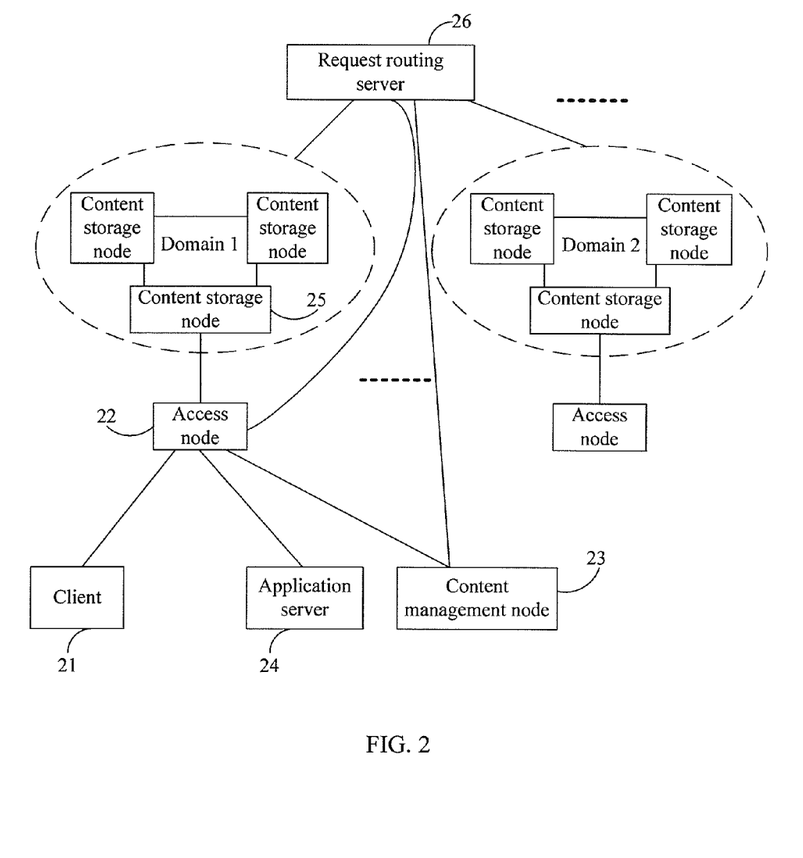
FIG. 2 is a schematic structural diagram of a system for obtaining data according to the first embodiment of the present invention.

FIG. 2 is a schematic structural diagram of a system for obtaining data according to the first embodiment of the present invention. The system for obtaining data in this embodiment includes a client 21, an access node (Edge Server, ES) 22, a content management node (Media Manager, MM) 23, an application server (Application, APP) 24, and a content storage node (Center Server, CS) 25. To improve manageability and reliability of the system, the system may further include a request routing server (Request Routing Server, RRS) 26. The access node 22, the content management node 23, the content storage node 25, and the RRS 26 are all modules of a storage platform. The client 21 provides an interface between a user and the storage platform to implement such as uploading, downloading, and deletion of data. The access node 22 is an interface for the storage platform to communicate with the outside. The access node 22 may provide only one IP address or a small quantity of IP addresses to the outside, which is responsible for forwarding a user request and message and obtaining and forwarding data, and is responsible for authenticating legality of the user request. The content management node 23 is responsible for managing content and stores basic information about all content in the storage platform, including a content ID, an application ID corresponding to the content ID, and whether the content has a public attribute. The application server 24 manages a mapping relationship between a user and the content and manages rights information of the user. The content storage node 25 is responsible for storing the content and a mapping relationship between the content and the content storage node. The content storage node may be divided to multiple domains according to a physical position, where each of the domains matches one or multiple access nodes. The RRS 26 is responsible for managing the client 21, the access node 22, the content management node 23, and the content storage node 25, initializing configuration information of each node, and allocating and managing the domains and the nodes.

Figure 3:
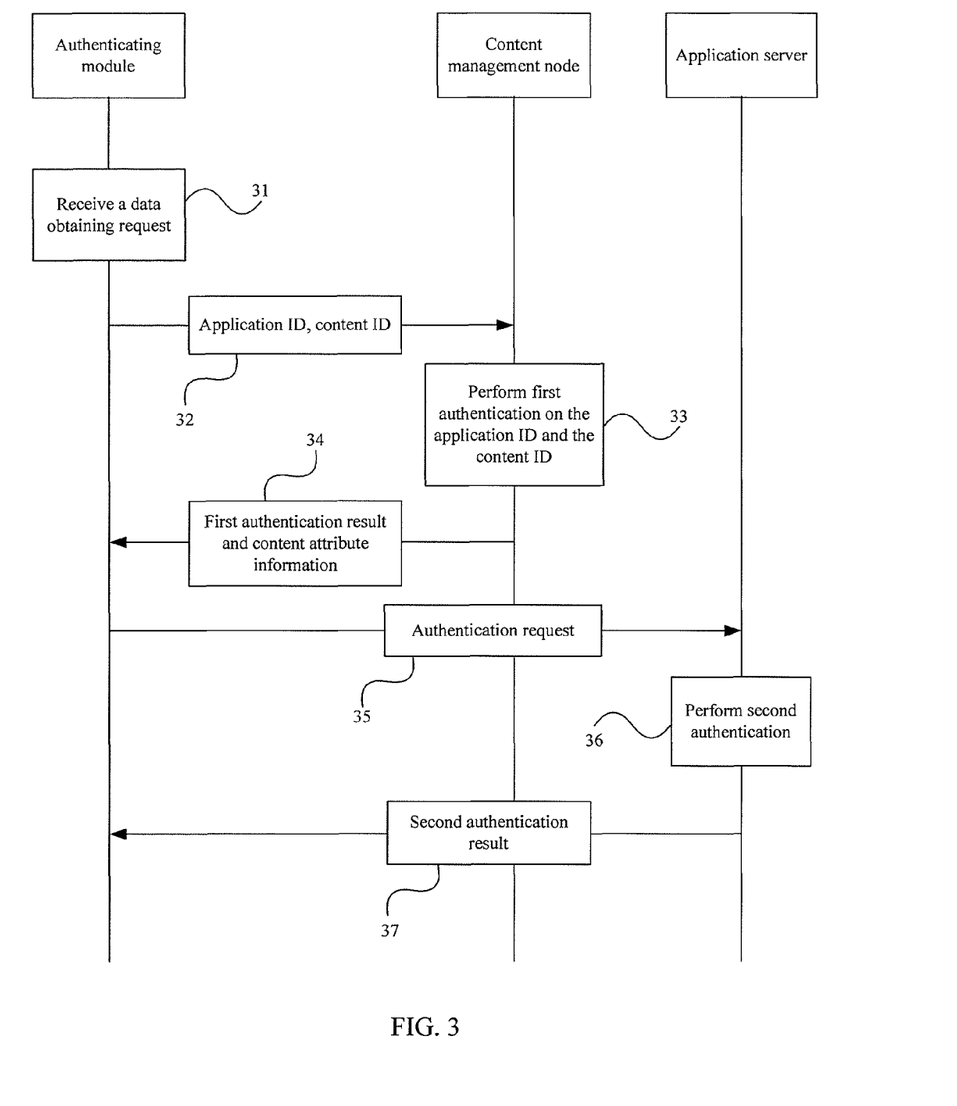
FIG. 3 is a schematic flowchart of step 11 in the method according to the first embodiment of the present invention.

FIG. 3 is a schematic flowchart of step 11 in the method according to the first embodiment of the present invention, including the following steps:

Step 31: The authenticating module in the access node receives the data obtaining request, where the data obtaining request carries an application ID of the application server to which the client belongs and a content ID of the data to be obtained.

Step 32: The authenticating module sends the application ID and the content ID to the content management node.

Step 33: The content management node performs first authentication on a relationship between the application ID and the content ID. That is, the content management node judges whether the application ID is legal and whether the content ID belongs to the application.

Step 34: The content management node returns an authentication result of the first authentication (that is, a first authentication result) and attribute information corresponding to the content ID to the authenticating module, and when the attribute information is a non-public attribute, further returns an application server address list. When the first authentication result is error, it is indicated that the authentication fails. In this case, the data obtaining ends. When the first authentication result is successful and the attribute information is a public (Public) attribute, it is indicated that the authentication is successful. In this case, the authentication ends and subsequent data obtaining is started.

Step 35: When the first authentication result is successful but the attribute corresponding to the content ID is the non-public attribute, the authenticating module selects an address in the application server address list, for example, selects an address of an application server nearest to the access node, and sends an authentication request to the application server corresponding to the selected address, where the authentication request carries the content ID and a user ID of the client.

Step 36: The application server performs second authentication on a relationship between the user ID and the content ID. That is, the application server judges whether the client corresponding to the user ID has a permission to obtain the data to be obtained corresponding to the content ID.

Step 37: The application server returns an authentication result of the second authentication (a second authentication result) to the authenticating module. When the second authentication result is error, it is indicated that the authentication fails. In this case, the data obtaining ends. When the second authentication result is successful, it is indicated that the authentication is successful. In this case, the authentication ends and the subsequent data obtaining is started.

In the multilevel authentication process of this embodiment, the data obtaining request is authenticated by the content management node and the application server, which may enhance the security of data obtaining and ensures the legality; the content management node manages the application ID and the content ID rather than the user ID, which may improve scalability and universality of the storage platform; the application server address is obtained from the content management node instead of being configured on the access node, which may avoid a problem of high management cost caused by manual configuration of the application server address on the access node and avoid carrying the application server address in the data obtaining request sent by the access node so as to enhance the security; multiple application server addresses are registered to form an application server address list and thereby application servers may be distributed in different networks or double-line equipment rooms so as to support distributed application servers; the nearest application server is selected, which may speed up the authentication; the content management node returns the attribute information of the content and thereby, when the content has the public attribute, authentication with the application server may be unnecessary, which may increase a response speed, improve user experience, reduce a load of the application server, and save resources.

Figure 4:
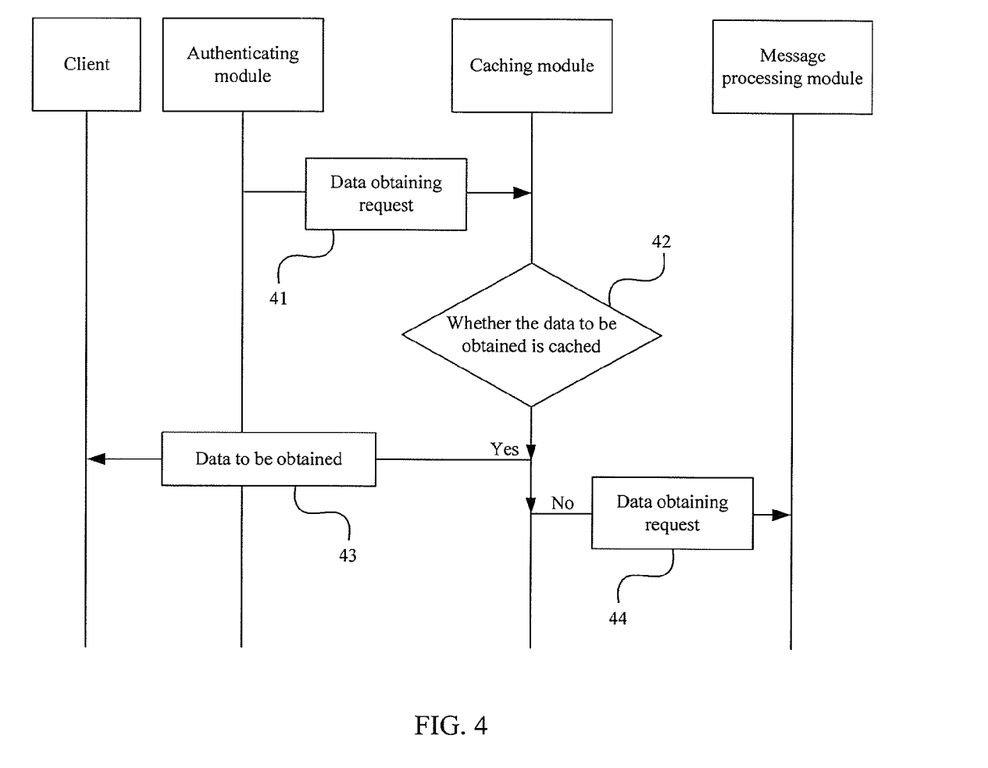
FIG. 4 is a schematic diagram of a processing procedure of a caching module in step 12 according to the first embodiment of the present invention.

FIG. 4 is a schematic diagram of a processing procedure of a caching module in step 12 according to the first embodiment of the present invention, including the following steps:

Step 41: When the authentication is successful, the authenticating module in the access node sends the data obtaining request to the caching module in the access node, where the data obtaining request carries the content ID of the data to be obtained.

Step 42: The caching module judges whether the data to be obtained corresponding to the content ID is cached, and if so, step 43 is performed, or else step 44 is performed.

Step 43: The caching module sends the cached data to be obtained to the client.

Step 44: The caching module sends the data obtaining request to the message processing module in the access node.

Afterwards, the message processing module and other modules in the access node send the client the data to be obtained corresponding to the data obtaining request or information about the content storage node to which the data to be obtained corresponding to the data obtaining request belongs so that the client obtains related data from the content storage node.

In a service dominated by sharing, for the number of times that the content is accessed by a user, a curve distribution situation may appear and some content may become hot for user access. In this case, hot content may be cached in the caching module, and when the user needs to obtain the hot content, the caching module directly sends the hot content to the user, thereby speeding up the data obtaining by the user, improving the user experience, and saving bandwidth resources.

Figure 5:
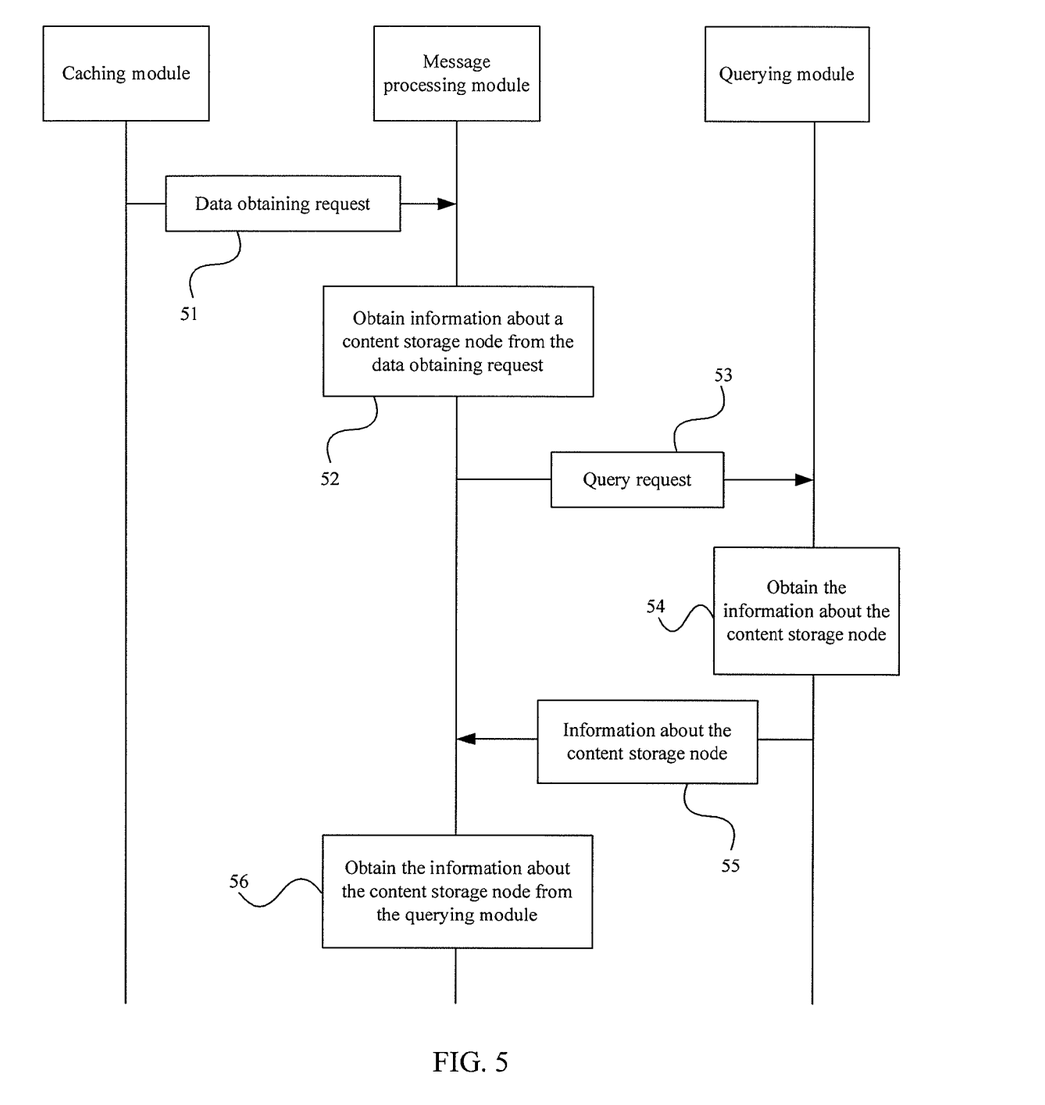
FIG. 5 is a schematic diagram of a processing procedure of a message processing module in step 12 according to the first embodiment of the present invention.

FIG. 5 is a schematic diagram of a processing procedure of a message processing module in step 12 according to the first embodiment of the present invention, including the following steps:

Step 51: The message processing module receives the data obtaining request sent by the caching module, where the data obtaining request carries the content ID of the data to be obtained and the data obtaining request may also carry information about the content storage node to which the data to be obtained belongs, and the information about the content storage node may be carried when the client sends the data obtaining request and may also be obtained and added by the authenticating module or the caching module.

When the data obtaining request carries the information about the content storage node, step 52 is performed.

Step 52: The message processing module directly obtains from the data obtaining request the information about the content storage node to which the data to be obtained belongs and may judge, according to the information about the content storage node, whether the content storage node and the access node are in the same domain, where domains may be divided according to a physical position of each node. Afterwards, the information about the content storage node is sent to the redirecting module, where the number of content storage nodes may be one or more than one.

When the data obtaining request does not carry the information about the content storage node, steps 53-56 are performed.

Step 53: The message processing module sends a query request to a content storage node (a querying module) corresponding to the access node, where a query request carries the content ID.

Step 54: According to the content ID, the querying module obtains the information about the content storage node to which the data to be obtained belongs.

Step 55: The querying module sends the information about the content storage node to which the data to be obtained belongs to the message processing module.

Step 56: The message processing module obtains from the querying module the information about the content storage node to which the data to be obtained belongs. Afterwards, the information about the content storage node is sent to the redirecting module, where the number of content storage nodes may be one or more than one.

When no cached data exist, the message processing module in this embodiment determines a content storage node that stores the data to be obtained to provide a basis for data obtaining.

Figure 6:
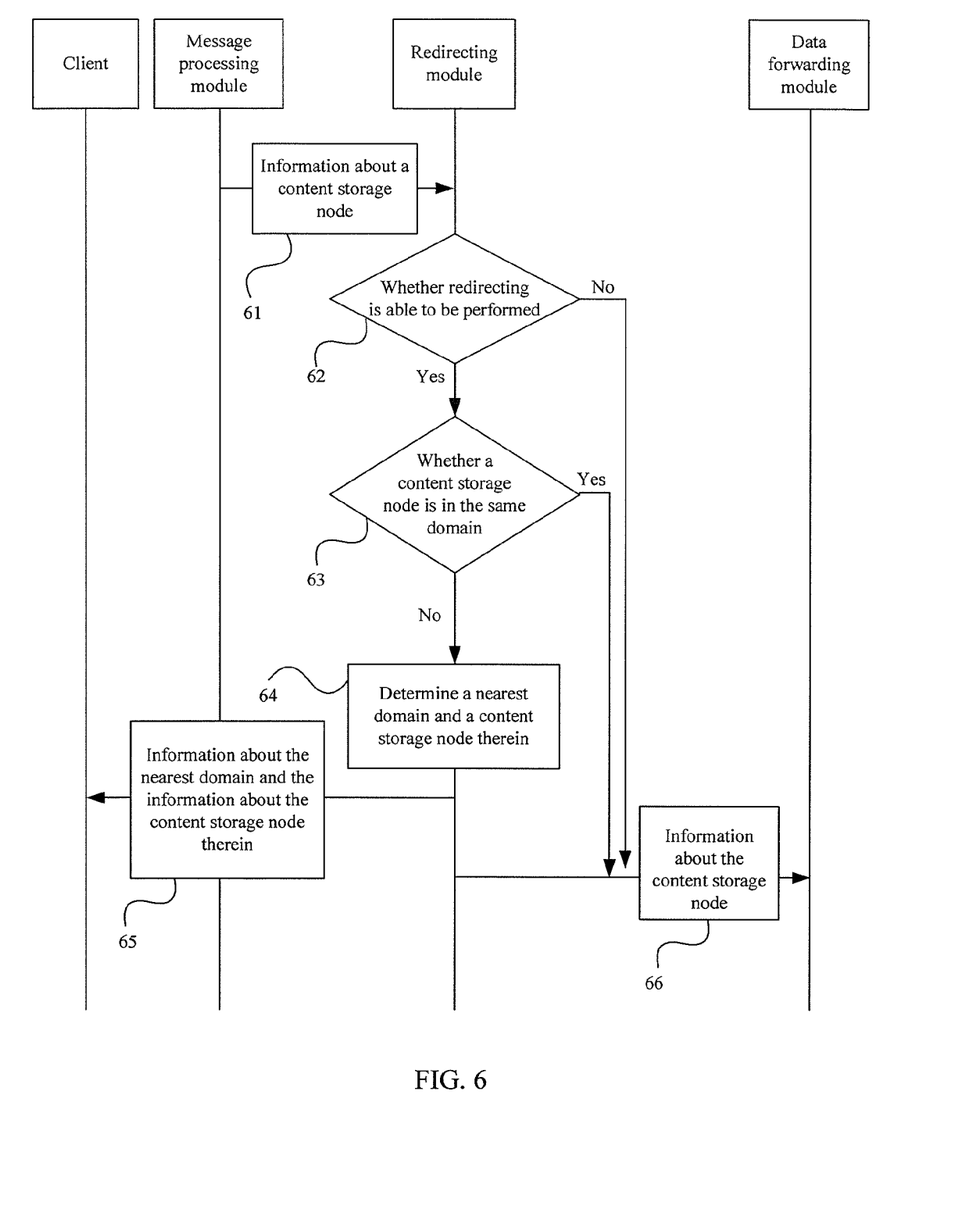
FIG. 6 is a schematic diagram of a processing procedure of a redirecting module in step 12 according to the first embodiment of the present invention.

FIG. 6 is a schematic diagram of a processing procedure of a redirecting module in step 12 according to the first embodiment of the present invention, including the following steps:

Step 61: The redirecting module receives the information about the content storage node sent by the message processing module.

Step 62: The redirecting module judges whether redirecting is able to be performed, and if so, step 63 is performed, or else step 66 is performed.

Whether a redirecting function of the redirecting module is enabled is pre-configured in the redirecting module, and when the redirecting function of the redirecting module is enabled, it is indicated that the redirecting module is able to perform redirecting; and when the redirecting function of the redirecting module is disabled, it is indicated that the redirecting module is unable to perform redirecting. Redirecting means that the redirecting module may obtain information about another domain so as to send the information about the another domain, such as the information about a content storage node in the another domain, to the client, so that the client may obtain data from the another domain. When the redirecting function is disabled, the client is able to obtain data only in a local domain, and when the data to be obtained is not stored in the local domain, the client cannot obtain the data to be obtained.

Step 63: According to the information about the content storage node, the redirecting module judges whether one of the content storage nodes is located in the same domain as the access node, and if so, step 66 is performed, or else step 64 is performed.

Step 64: The redirecting module determines a content storage node in a domain nearest to the access node.

Step 65: The redirecting module sends information about the nearest domain and information about the content storage node in the nearest domain to the client. In this way, the redirecting of data obtaining is implemented. Afterwards, the client may initiate, according to the content storage node in the new domain, a data obtaining request to an access node in the same domain as the content storage node in the new domain so as to obtain the data. That is, the procedure is re-executed from step 31, where the access node in step 31 needs to be replaced by the access node in the same domain as the content storage node in the new domain.

Step 66: The redirecting module sends the information about the content storage node to which the data to be obtained belongs to the data forwarding module.

In this embodiment, when a bandwidth is small or a speed is low, the redirecting module may redirect the user request to a domain where the content is located so as to increase the data transmission speed; the information about content storage node is carried in a redirected request, and in this way, when the request is redirected to the new domain, the access node in the new domain does not need to search for the content storage node. Therefore, the message volume is reduced and a speed of response to the request increases, thereby improving the user experience.

Figure 7:
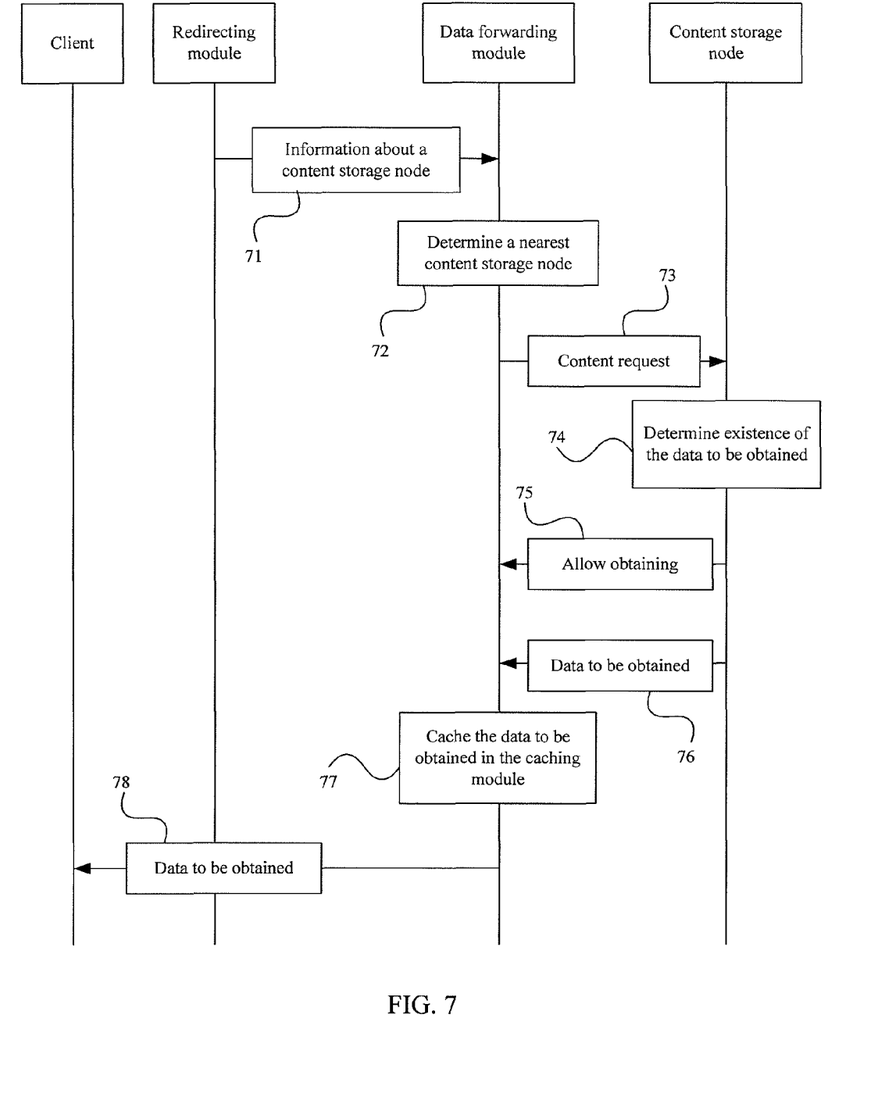
FIG. 7 is a schematic diagram of a processing procedure of a data forwarding module in step 12 according to the first embodiment of the present invention.

FIG. 7 is a schematic diagram of a processing procedure of a data forwarding module in step 12 according to the first embodiment of the present invention, including the following steps:

Step 71: The data forwarding module receives from the redirecting module the information about the content storage node to which the data to be obtained belongs.

Step 72: The data forwarding module determines a content storage node nearest to the access node in content storage nodes.

Step 73: The data forwarding module sends a content request to the nearest content storage node, where the content request carries the content ID of the data to be obtained.

Step 74: The content storage node judges whether itself stores data corresponding to the content ID. When it is determined that the data to be obtained exists, step 75 is performed and when the data is not stored, error information may be returned.

Step 75: When the data corresponding to the content ID is stored, send obtaining allowed information to the data forwarding module.

Step 76: The content storage node sends the data to be obtained corresponding to the content ID to the data forwarding module.

Step 77: When the number of times that the data to be obtained is obtained reaches a preset click-through rate threshold, cache the data to be obtained in the caching module.

Step 78: The data forwarding module forwards the data to be obtained to the client.

Afterwards, the data forwarding module may further send a transmission complete message to the content storage node and the client to end the transmission. The data forwarding module may further report traffic information to the content management node so that the content management node performs charging processing.

Figure 8:
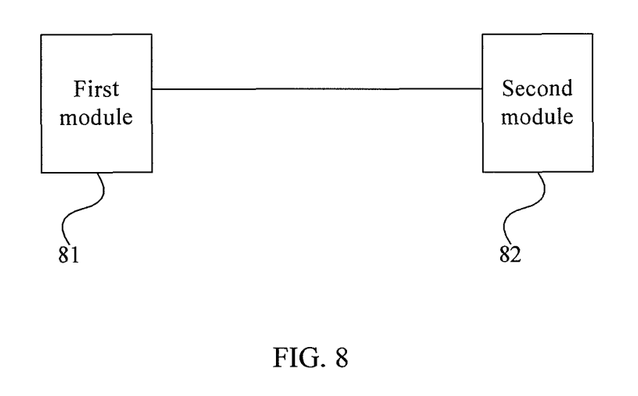
FIG. 8 is a schematic structural diagram of an access node according to a second embodiment of the present invention.

FIG. 8 is a schematic structural diagram of an access node according to a second embodiment of the present invention, including a first module 81 and a second module 82. The first module 81 is configured to receive a data obtaining request sent by a client and obtain an authentication result of multilevel authentication performed on the data obtaining request. The second module 82 is configured to, when the authentication result of the data obtaining request is successful, obtain data to be obtained corresponding to the data obtaining request and send the data to be obtained to the client, or, obtain information about a content storage node to which the data to be obtained corresponding to the data obtaining request belongs and send the information about the content storage node to the client.

In this embodiment, the data obtaining request is received and processed by an access node, so that one or more than one IP address may be disclosed publicly to reduce the cost; multilevel authentication is performed on the data obtaining request, which may enhance security of data obtaining; and the data obtaining is completed jointly by the access node, an authentication node, and a data storage node, thereby avoiding problems of single-point failure and bottleneck.

Figure 9:
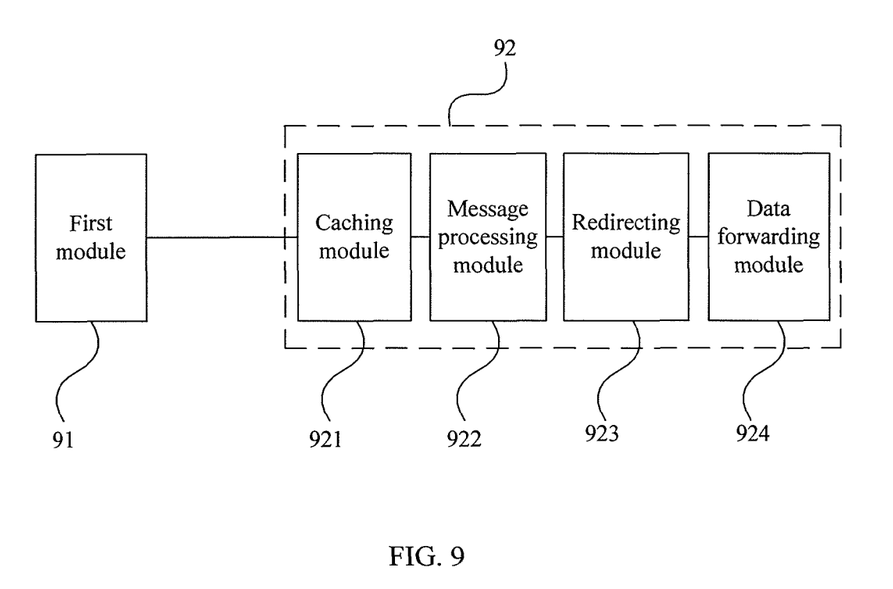
FIG. 9 is a schematic structural diagram of an access node according to a third embodiment of the present invention.

FIG. 9 is a schematic structural diagram of an access node according to a third embodiment of the present invention, including a first module 91 and a second module 92, where the second module 92 includes a caching module 921, a message processing module 922, a redirecting module 923, and a data forwarding module 924. The caching module 921 is configured to cache data to be obtained and send the cached data to be obtained to a client. The message processing module 922 is configured to, when the data to be obtained is not cached in the caching module, obtain information about a content storage node storing the data to be obtained. The redirecting module 923 is configured to receive the information about the content storage node sent by the message processing module and, when it is determined, according to the information about the content storage node, that redirecting is able to be performed and that none of content storage nodes is in the same domain as the access node, determine a content storage node in a domain nearest to the access node, and send information about the nearest domain and a corresponding content storage node list to the client; or when it is determined, according to the information about the content storage node, that redirecting is able to be performed and that a node in the content storage nodes is in the same domain as the access node, or when redirecting cannot be performed, send the information about the content storage node. The data forwarding module 924 is configured to receive the information about the content storage node sent by the redirecting module, determine a content storage node nearest to the access node, obtain from the nearest content storage node the data to be obtained, and send the data to be obtained to the client. The caching module 921 may be further configured to cache the data to be obtained when the number of times that the data to be obtained is obtained reaches a preset click-through rate threshold.

This embodiment may further extend the application scope on the basis of the second embodiment to improve system performance, increase a speed of data obtaining, and enhance user experience.

Figure 10:
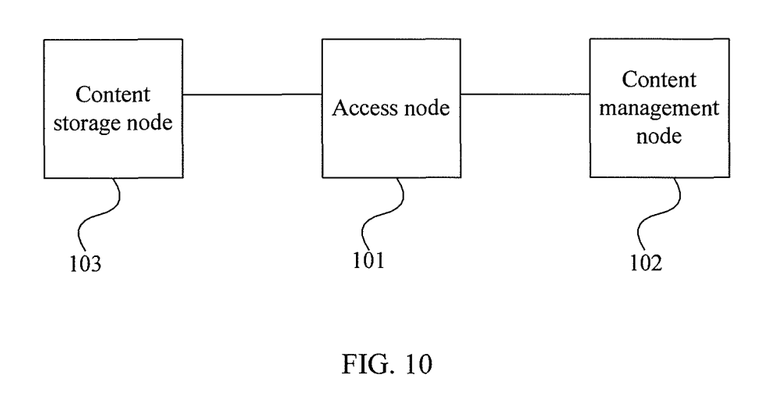
FIG. 10 is a schematic structural diagram of a system for obtaining data according to a fourth embodiment of the present invention.

FIG. 10 is a schematic structural diagram of a system for obtaining data according to a fourth embodiment of the present invention, including an access node 101 and a content management node 102. The access node 101 is configured to receive a data obtaining request sent by a client, where the data obtaining request carries an application ID of an application server to which the client belongs and a content ID of data to be obtained. The content management node 102 is configured to perform first authentication on a relationship between the application ID and the content ID and return a first authentication result and attribute information corresponding to the content ID to the access node. The access node 101 is further configured to obtain an authentication result of the data obtaining request according to the first authentication result and the attribute information and, when the authentication result of the data obtaining request is successful, obtain the data to be obtained corresponding to the data obtaining request and send the data to be obtained to the client, or obtain information about a content storage node to which the data to be obtained corresponding to the data obtaining request belongs and send the information about the content storage node to the client.

When the attribute information is a public attribute, the access node is specifically configured to regard the first authentication result as a final authentication result; or, when the attribute information is a non-public attribute, the content management node further returns an application server address list and the access node is further configured to select one from the application server address list and send an authentication request to an application server corresponding to the selected address, where the authentication request may carry the content ID and a user ID of the client, and the system further includes an application server, configured to perform second authentication on a relationship between the user ID and the content ID and return a second authentication result to the access node, and afterwards, the access node may regard the second authentication result as the final authentication result.

Further, this embodiment may further include a content storage node 103, where the content storage node 103 is configured to store the data to be obtained. In this case, the access node 101 is specifically configured to obtain the data to be obtained from the content storage node 103. Or, the content storage node 103 may further store the information about the content storage node to which the data to be obtained belongs so that the data to be obtained is obtained according to the information about the content storage node.

For relevant descriptions about the apparatuses and the system in this embodiment of the present invention, reference may be made to the description about related parts in the method embodiment and repeated descriptions are not provided herein.

In this embodiment, the data obtaining request is received and processed by an access node, so that one or more than one IP address may be disclosed publicly to reduce the cost; multilevel authentication is performed on the data obtaining request, which may enhance security of data obtaining; and the data obtaining is completed jointly by the access node, an authentication node, and a data storage node, thereby avoiding problems of single-point failure and bottleneck.

Persons of ordinary skill in the art may understand that all or a portion of the steps in the methods provided in the embodiments of the present invention may be implemented by hardware under an instruction of a program. The program may be stored in a computer readable storage medium and when the program is executed, the steps in the methods provided in the embodiments of the present invention are performed. The storage medium includes any medium that is capable of storing program codes, such as a ROM, a RAM, a magnetic disk, or a CD-ROM. The program may also be stored in a storage device, where the storage device includes but is not limited to a PC magnetic disk, a disk array, a network-attached storage (NAS), or a storage area network (SAN).

Finally, it should be noted that the preceding embodiments are intended for describing the technical solutions of the present invention rather than limiting the present invention. Although the present invention is described in detail with reference to specific embodiments, persons of ordinary skill in the art should understand that modifications and substitutions can still be made to the technical solutions of the present invention without departing from the spirit and scope of the technical solutions of the present invention.

What is claimed is:

1. A method of obtaining data, the method comprising:
receiving, by an access node, a data request sent by a client;
obtaining, by the access node, a first authentication result for the data request from a content management node;
when the first authentication result is successful and the data requested in the data request is non-public data, sending, by the access node, an authentication request to an application server to authenticate the data request, and receiving from the application server a second authentication result; and
when the second authentication result of the data request is successful,
obtaining, by the access node, data corresponding to the data request and sending the obtained data to the client, or obtaining, by the access node, information about a content storage node having data corresponding to the data request and sending the information about the content storage node to the client.

2. The method according to claim 1, wherein:
the data request carries an application ID and a content ID of the data to be obtained;
wherein obtaining, by the access node, the first authentication result for the data request from the content management node comprises:
sending the application ID and the content ID to the content management node;
receiving the first authentication result returned by the content management node, wherein the first authentication result is determined by a relationship between the application ID and the content ID.

3. The method according to claim 1,
the method further comprising
after receiving the data request sent by a client, obtaining, by the access node, attribute information, wherein the attribute information indicates the data requested in the data request is public data or non-public data.

4. The method according to claim 1, wherein the obtaining the data corresponding to the data request and sending obtained the data to the client, or obtaining, by the access node, the information about the content storage node having data corresponding to the data request and sending the information about the content storage node to the client comprise:

when an access node caches the data to be obtained, sending the cached data to be obtained to the client; or
when the access node does not cache the data to be obtained,
obtaining information about a content storage node storing the data to be obtained, and
obtaining, according to the information about the content storage node from the content storage node, the data to be obtained and sending the data to be obtained to the client, or sending the information about the content storage node to the client.

5. The method according to claim 4, wherein the obtaining, according to the information about the content storage node from the content storage node, the data to be obtained and sending the data to be obtained to the client, or sending the information about the content storage node to the client comprises:
when redirecting is able be performed and none of content storage nodes is in a same domain as the access node, determining a content storage node in a domain nearest to the access node, and sending information about the nearest domain and a corresponding content storage node list to the client; or
when redirecting is able to be performed and a node in the content storage nodes is in the same domain as the access node, or when redirecting cannot be performed, determining a content storage node nearest to the access node, obtaining from the nearest content storage node the data to be obtained, and sending the data to be obtained to the client.

6. The method according to claim 4, wherein:
the obtaining the information about the content storage node storing the data to be obtained comprises:
obtaining the information about the content storage node from the data request; or
sending a query request to a querying module, receiving a query result returned by the querying module according to the query request, and obtaining the information about the content storage node from the query result.

7. An access node, the access node comprising a processor having a first module and a second module, wherein:
the first module, configured to receive a data request sent by a client and obtain a first authentication result for the data request from a content management node, and when the first authentication result is successful and the data requested in the data request is non-public data, send an authentication request to an application server to authenticate the data request, and receive from the application server a second authentication result; and
the second module, configured to, when the second authentication result of the data request is successful, obtain data corresponding to the data request and send the data to the client, or obtain information about a content storage node to which the having data corresponding to the data request belongs and send the information about the content storage node to the client.

8. The access node according to claim 7, wherein the second module comprises:
a caching module, configured to cache the data to be obtained and send the cached data to be obtained to the client.

9. The access node according to claim 8, wherein the second module further comprises:
a message processing module, configured to, when the caching module does not cache the data to be obtained, obtain information about a content storage node storing the data to the obtained.

10. The access node according to claim 9, wherein the second module further comprises:
a redirecting module, configured to receive the information about the content storage node sent by the message processing module and, when it is determined, according to the information about the content storage node, that redirecting is able to be performed and that none of content storage nodes is located in a same domain as the access node, determine a content storage node in a domain nearest to the access node, and send information about the nearest domain and a corresponding content storage node list to the client; and when it is determined, according to the information about the content storage node, that redirecting is able to be performed and that a node in the content storage nodes is in the same domain as the access node, or when redirecting cannot be performed, send the information about the content storage node.

11. The access node according to claim 10, wherein the second module further comprises:
a data forwarding module, configured to receive the information about the content storage node sent by the redirecting module, determine a content storage node nearest to the access node, obtain from the nearest content storage node the data to be obtained, and send the data to be obtained to the client.

12. A system configured to obtain data, the system comprising:
an access node, configured to receive a data request sent by a client, the data request including an application ID of an application server accessible by the client and a content ID of data to be obtained; and
a content management node, configured to perform first authentication on a relationship between the application ID and the content ID, and return a first authentication result and attribute information corresponding to the content ID to the access node, wherein the attribute information indicates whether the data to be obtained is public or non-public data; wherein
the access node is further configured to obtain an authentication result of the data request according to the first authentication result and the attribute information, and when the authentication result of the data request is successful, obtain the data to be obtained corresponding to the data request, and send the data to be obtained to the client, or obtain information about a content storage node to which the data to be obtained corresponding to the data request belongs and send the information about the content storage node to the client.

13. The system according to claim 12, wherein:
when the attribute information is a non-public attribute, the content management node further returns an application server address list and the access node is further configured to select one from the application server address list and send an authentication request to an application server corresponding to the selected address; and
the system further comprises:
an application server, configured to perform second authentication on a relationship between a user ID and the content ID and return a second authentication result to the access node.

14. The system according to claim 12, further comprising:
a content storage node, configured to store the data to be obtained, so that the access node obtains from the content storage node the data to be obtained.

15. A method of obtaining data from a storage platform, the method comprising:

receiving, by an access node, a data request from a client, the data request comprising an application ID and a content ID;

when a relationship between the application ID and the content ID is valid and the content ID relates to non-public data, sending, by the access node, an authentication request to an application server, the authentication request comprising the content ID and a client ID, and receiving, at the access node, an authentication result; and when the received authentication result is successful,
   obtaining, by the access node, data corresponding to the data request and sending the obtained data to the client, or
   obtaining, by the access node, information about a content storage node having data corresponding to the data request and sending the information about the content storage node to the client.

16. The method according to claim 1, wherein sending, by the access node, an authentication request to an application server to authenticate the data request, and receiving from the application server a second authentication result comprises:
   when the data requested in the data request is non-public data, receiving an application server address list returned by the content management node;
   selecting one application server from the application server address list;
   sending an authentication request to the selected application server; and
   receiving a second authentication result from the selected application server.

* * * * *